United States Patent
Dappen et al.

(10) Patent No.: US 8,835,820 B2
(45) Date of Patent: Sep. 16, 2014

(54) INDUCTOR AND USE OF SUCH AN INDUCTOR

(75) Inventors: Stefan Dappen, Aachen (DE); Peter Schulte, Wuppertal (DE); Matthias Blum, Wipperfürth (DE); Martin Bröcking, Remscheid (DE)

(73) Assignee: SMS Elotherm GmbH, Remscheid (DE)

(*) Notice: Subject to any disclaimer, the term of this patent is extended or adjusted under 35 U.S.C. 154(b) by 236 days.

(21) Appl. No.: 12/878,631

(22) Filed: Sep. 9, 2010

(65) Prior Publication Data

US 2011/0073590 A1 Mar. 31, 2011

(30) Foreign Application Priority Data

Sep. 10, 2009 (DE) .......................... 10 2009 040 825

(51) Int. Cl.
*H05B 6/40* (2006.01)
*C21D 1/42* (2006.01)
*C21D 1/10* (2006.01)
*C21D 9/40* (2006.01)
*C21D 1/667* (2006.01)

(52) U.S. Cl.
CPC .. *C21D 1/10* (2013.01); *H05B 6/40* (2013.01); *C21D 1/42* (2013.01); *C21D 2221/00* (2013.01); *C21D 9/40* (2013.01); *C21D 1/667* (2013.01)
USPC ........................................................ 219/660

(58) Field of Classification Search
USPC .................. 219/660, 635, 619, 639, 201–205
See application file for complete search history.

(56) References Cited

U.S. PATENT DOCUMENTS

| | | | |
|---|---|---|---|
| 4,673,785 A * | 6/1987 | Damiani | 219/642 |
| 5,173,246 A | 12/1992 | Schwarz et al. | |
| 6,570,141 B2 | 5/2003 | Ross | |
| 7,350,976 B2 | 4/2008 | Ohtsuki et al. | |

FOREIGN PATENT DOCUMENTS

| | | |
|---|---|---|
| DE | 1565244 | 8/1971 |
| DE | 3843457 C1 | 7/1989 |
| DE | 4021025 C1 | 9/1991 |
| DE | 602004009851 T2 | 8/2008 |
| GB | 1089097 | 11/1967 |
| GB | 2248854 A | 4/1992 |

* cited by examiner

*Primary Examiner* — Dana Ross
*Assistant Examiner* — Renee L Miller
(74) *Attorney, Agent, or Firm* — The Webb Law Firm

(57) ABSTRACT

An inductor is provided for the simultaneous inductive heating of two tracks or ways which are formed next to one another on a metallic workpiece, having a first segment which is associated with the first track or way and a second segment which is associated with the second track or way, and having two supply arms via which the segments can be connected to a power supply. To enable two tracks or ways to be heated simultaneously to the hardening temperature without heating the material portion situated between the tracks or ways the segments of the inductor and the supply arms are connected together in an inductor in such a way that the fields travelling at right angles to the longitudinal extent of the tracks or ways neutralize each other in the region of the material portion which separates the tracks or ways from one another.

26 Claims, 5 Drawing Sheets

INDUCTOR AND USE OF SUCH AN INDUCTOR

BACKGROUND OF THE INVENTION

1. Field of the Invention

The invention relates to an inductor for the simultaneous inductive heating of two tracks or ways which are arranged next to one another at a distance and which are formed on a metallic workpiece, the inductor having a first segment which is associated with the first track or way and a second segment which is associated with the second track or way, and having two supply arms via which the segments of the inductor can together be connected to a power supply.

As well as this, the invention also relates to a particularly advantageous use of such inductors.

2. Description of the Related Art

Inductors of the kind being considered here are used in machines for hardening portions of metallic workpieces, by a hardening operation which may if required be carried out in rotation, to bring that portion of the workpiece which is to be hardened at the time to the hardening temperature. A cooling fluid is then applied to the portion which has been heated at the time and this cooling fluid cools the portion concerned so quickly that a hardened microstructure forms therein.

Inductors of the kind specified in the opening paragraph, which are also known as "double inductors" in the specialist vocabulary, are used in practice to enable inductive heating which is time-saving and energy-efficient to be carried out with only simple equipment in the case of workpieces on which tracks or ways extending in parallel are to be hardened. The inductors which are used for this purpose have two segments which are connected in series and of which one is associated with one of the tracks or ways to be heated and the other is associated with the other track or way. The supply of power takes place in this case via a connection which is provided at the side of the double inductor.

Large double-row ball bearings have grooves which serve as tracks for the particular rolling elements and these grooves can be heated to whatever hardening temperature is required in the given case in a particularly efficient way with inductors of this kind. The tracks of rolling bearings of this kind need to be sufficiently hard to be able to withstand in the long term the high and locally closely confined compressive loads which occur in operation. The ridge which is present between the tracks and which guides the rolling elements needs, on the other hand, to be sufficiently tough to be able to safely absorb the transverse forces which occur in operation without the risk of its fracturing.

To harden the tracks of such large double-row ball bearings, the two tracks are heated simultaneously with a double inductor. In contrast to hardening of the two tracks in succession, this gives increased throughput despite the fact that only one power source is used. Also, tempering effects in both directions, which may occur as a result of heat conduction when hardening takes place in succession, are avoided.

However, there is a disadvantage to the simultaneous inductive heating of tracks or ways extending in parallel with one another which are separated by a material portion which is generally of a strip-like or ridge-like form, namely that the material portion situated between the tracks or ways is also covered by the electromagnetic field induced by the inductor. The resultant heating may be sufficiently extensive for a hardened microstructure to form across the entire width of the material portion situated between the tracks or ways which are to be hardened.

This effect is found to be particularly critical when what are being hardened are the tracks of double-row rolling bearings in which the distance between the tracks is small, or in other words the ridge left between them is comparatively thin. If the ridge is hardened throughout, it loses the toughness it needs and there may be a fracture of the material as a result of the loads occurring in operation.

SUMMARY OF THE INVENTION

Against this background, the object of the invention was, with simple means, to provide an inductor with which two tracks or ways arranged next to one another could be heated simultaneously to the hardening temperature without the material portion situated between the tracks or ways to be heated being heated throughout to this temperature in the process. The intention was also to specify an advantageous use of such an inductor.

With regard to the inductor, this object has been achieved in accordance with the invention by virtue of the fact that such an inductor is designed as specified in claim 1.

Advantageous embodiments of an inductor according to the invention are specified in the claims which are referred back to claim 1.

An inductor according to the invention may be used particularly effectively for the purpose specified in claim 10. Advantageous embodiments of this use according to the invention are specified in the claims which are referred back to claim 10.

An inductor according to the invention for the simultaneous inductive heating of two tracks or ways formed on a metallic workpiece which are arranged next to one another at a distance has, as in the prior art, a first segment which is associated with the first track or way and a second segment which is associated with the second track or way plus two supply arms via which the segments of the inductor can together be connected to a power supply.

In accordance with the invention, the segments of the inductor and the supply arms are then connected together in such a way that the currents travelling at right angles to the longitudinal extent of the tracks or ways neutralize each other in the region of the material portion which separates the tracks or ways from one another. In this way, there is in the workpiece at least a minimised flow of current across the material portion of the workpiece which is present between the tracks or ways to be hardened. Therefore, even though they act simultaneously on the tracks or ways to be respectively heated by them, the fields which are induced by the inductor according to the invention themselves no longer produce a direct input of heat which extends across the entire width of the material portion present between the fields.

This does not of course rule out the possibility of those portions of the surface of the material portion separating the tracks or ways which directly adjoin the tracks or ways to be hardened each being deliberately raised to the hardening temperature to ensure that adequate resistance to abrasive wear exists at them as well. However, the connecting-up in accordance with the invention of the segments of the inductor ensures that the fields induced by them are limited in such a way that there is left in the material portion a region which is not heated as a result of the action of the induced fields to a temperature sufficient for a hardened microstructure to form.

Thus, when an inductor according to the invention is being used, excessive heating of the material portion separating the tracks or ways to be heated from one another may still occur merely as a result of heat conduction. To counter even this risk, one embodiment of the invention makes provision for a cooling means to be provided which, during the heating of the tracks or ways to be hardened, delivers a cooling fluid onto the portion of the workpiece which is present between the tracks or ways to be hardened. The cooling means, which may for example have one or more nozzles, is therefore so positioned that, in practical use, the fluid delivered by it impinges directly on the material portion separating the tracks or ways to be heated.

To allow a particularly compact layout to be obtained, the cooling means may for example be arranged in the space present between the segments of the inductor.

However, it is equally possible for the particular nozzle of the cooling means to be arranged outside the space enclosed by the segments of the inductor. This may possibly prove to be helpful when the effect of the inductor is to be affected as little as possible by the cooling means or the cooling means is to be produced from materials which are unable to withstand the high heating temperatures in the region of the tracks.

If the cooling means is arranged outside the space enclosed by the segments of the inductor, the flow of fluid delivered by the cooling means is usefully so aligned that it impinges on the ridge to be cooled in the region acted on by the inductor and in particular in the region of the space enclosed by the segments of the inductor. For this purpose the nozzle may have a duct, formed for example from sufficiently strong pipe or tubing, which reaches into the space between the segments of the inductor and which points into the space present between the segments of the inductor and at whose free end the given nozzle for delivering the cooling fluid is formed.

By means of the fluid delivered, the heat which is excessive at the material portion is withdrawn therefrom, which means that the temperature required for a hardened microstructure to form is not reached. What are suitable as cooling fluids are, basically, all liquids which ensure that sufficient heat is carried away. However, in cases where accumulations of cooling fluid which would hamper the inductive heating might occur in the region of the tracks or ways to be heated, it is advantageous for the cooling means to deliver a gaseous cooling fluid, and in particular air or nitrogen. Gaseous cooling fluids have in this case the advantage on the one hand that accumulations of fluid which would degrade the results of the heating operation in the region of the tracks or ways to be hardened do not form in this region and on the other hand that there is a guarantee of a comparatively gentle withdrawal of heat which avoids the risk of warping or undesirable phases occurring.

In the case of inductors according to the invention in which there are sections which extend immediately next to one another of the segments of the inductor which are associated with the tracks or ways to be heated, the connecting-up in accordance with the invention may for example be accomplished by connecting the segments of the inductor which are concerned to the supply arms in such a way that the direction of flow of the current is in opposite directions in sections of the segments of the inductor which extend parallel to one another and which are aligned in the longitudinal direction of the tracks or ways to be heated.

Basically, the connecting-up and arrangement according to the invention of the segments of the inductor can even be implemented when the segments of the inductor are connected in series. However, a particularly simple circuit and arrangement are obtained when the segments of the inductor are connected in parallel with one another. What in particular the connection in parallel makes possible is supply arms which are short and easily shaped.

It is equally possible even for individual sections of the segments of the inductor to be connected in parallel or in series. In this way, the heating outputs can be adjusted to suit the given heating task or the special features of the geometry of the workpiece.

A particularly simple design is obtained for the inductor if the supply arms extend between the segments of the inductor. When this is the case, the space which is enclosed by the segments of the inductor is used for the segments of the inductor to be arranged in, thus making the layout of the inductor particularly compact. The particular advantage of this arrangement lies in this case in the fact that the supply arms can be used to reduce to a minimum the electromagnetic field which is active in the region of the material portion separating the tracks or ways to be heated.

This proves to be particularly useful when, in an inductor according to the invention, the segments of the inductor each have at least two heating sections which are connected in series, which extend at right angles to the respective track or way to be heated and which are of a shape matched to the cross-sectional shape of the said track or way, and when the segments of the inductor have a connecting section which connects the heating sections together. In this way it is possible, in a manner according to the invention, to connect up and operate even inductors in which the segments of the inductors comprise three or more heating sections. In this connection, an embodiment of the invention which is particularly suitable for, in particular, the heating of tracks of large ball bearings which extend in parallel makes provision for there to be in each case at least four heating sections connected in series to provide particularly high heating outputs. In an embodiment comprising segments of the inductor which comprise three or more heating sections, at least one connecting section is typically arranged closely adjacent to each of the supply arms.

If different heating outputs are to be applied, this can also be done by causing the segments of the inductor, or rather the heating sections thereof, to cover different respective lengths of the tracks or ways to be hardened which are respectively associated with them.

Because of its special design, an inductor configured in accordance with the invention is particularly suitable for the simultaneous inductive heating of two tracks or ways which are formed on a workpiece next to one another and at a distance from one another. Such a workpiece is typically a part of a rolling bearing in which there have been formed two grooves for rolling elements of the rolling bearing, which grooves form the tracks or ways to be heated and are separated from one another by a ridge. By using an inductor according to the invention, it is possible with particular ease for the tracks of the part of the rolling bearing to be effectively hardened with only simple equipment while at the same time it is ensured that the material of the ridge left between the tracks remains sufficiently tough.

BRIEF DESCRIPTION OF THE DRAWINGS

In what follows, the invention will be explained in more detail by reference to drawings showing exemplary embodiments. In the drawings, which are each schematic.

DETAILED DESCRIPTION OF THE INVENTION

The inductors 1, 1a, 101 which are shown in the drawings are used to heat the tracks L1, L2, which are merely indicated here for the sake of clarity, of a bearing ring C, which is not otherwise shown, of a double-row rolling bearing which is likewise not shown. The tracks L1, L2 are formed in this case in the steel material of the ring C in the form of grooves extending parallel to one another and are separated from one another by a narrow material portion S in the form of a ridge which is left between them. The width Bs of this material portion S is considerably less than the width Bl of the tracks L1, L2.

Each of the inductors 1, 1a, 101 has two segments 2, 3; 102, 103 which are connected in parallel with one another and of which respective first segments 2, 102 are associated with the track L1 and respective second segments 3, 103 are associated with the track L2.

Figure 1:
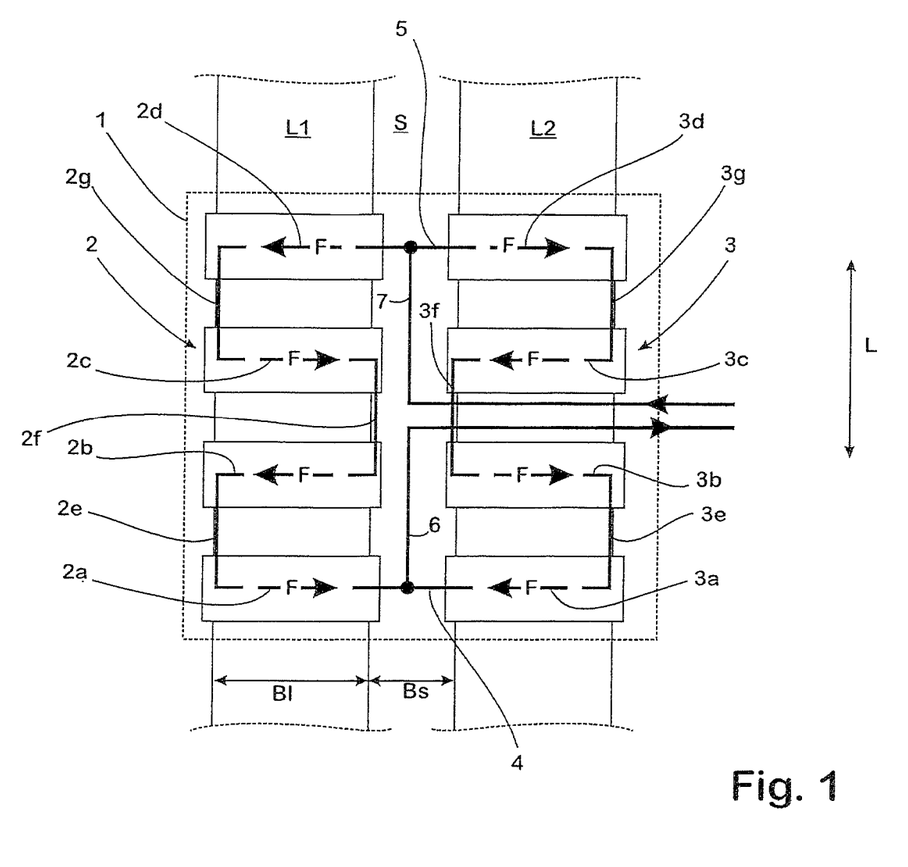
FIG. 1 shows a way of connecting up the segments and supply arms of an inductor for hardening the tracks of a double-row rolling bearing.
Figure 2:
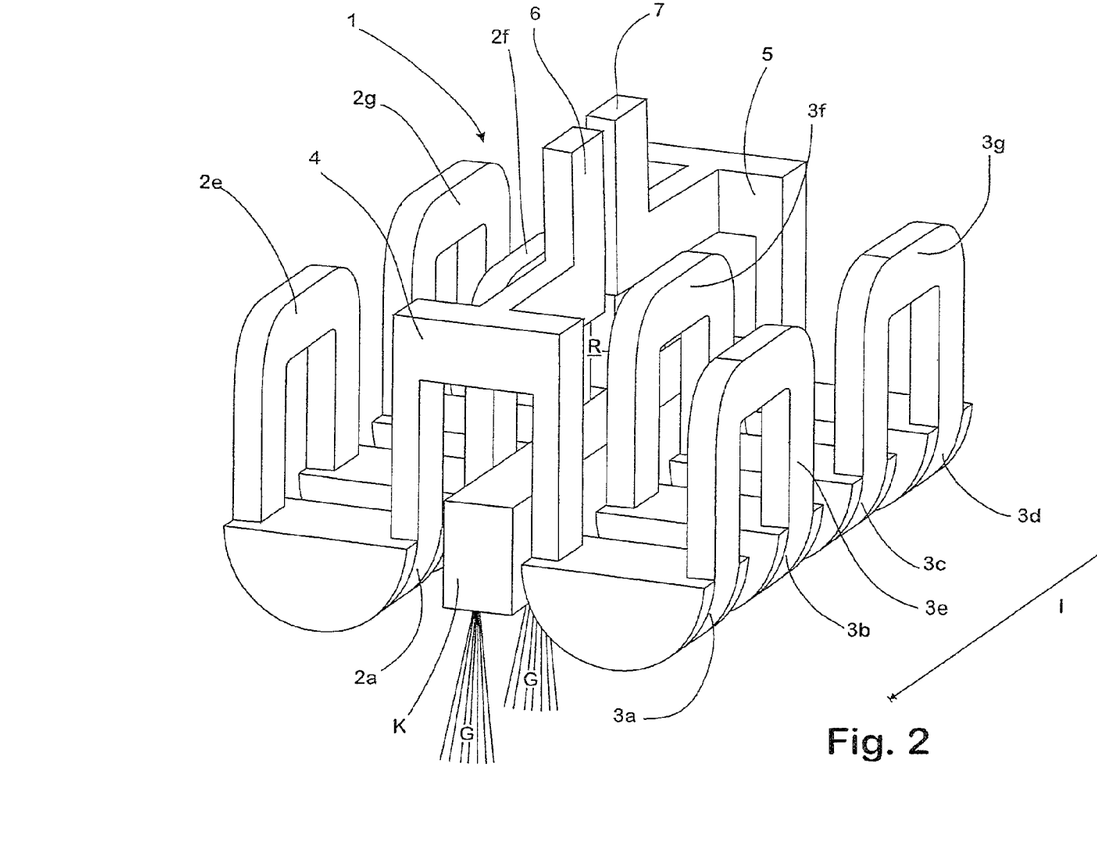
FIG. 2 is a perspective view of the inductor which is connected up as shown in FIG. 1.
Figure 3:
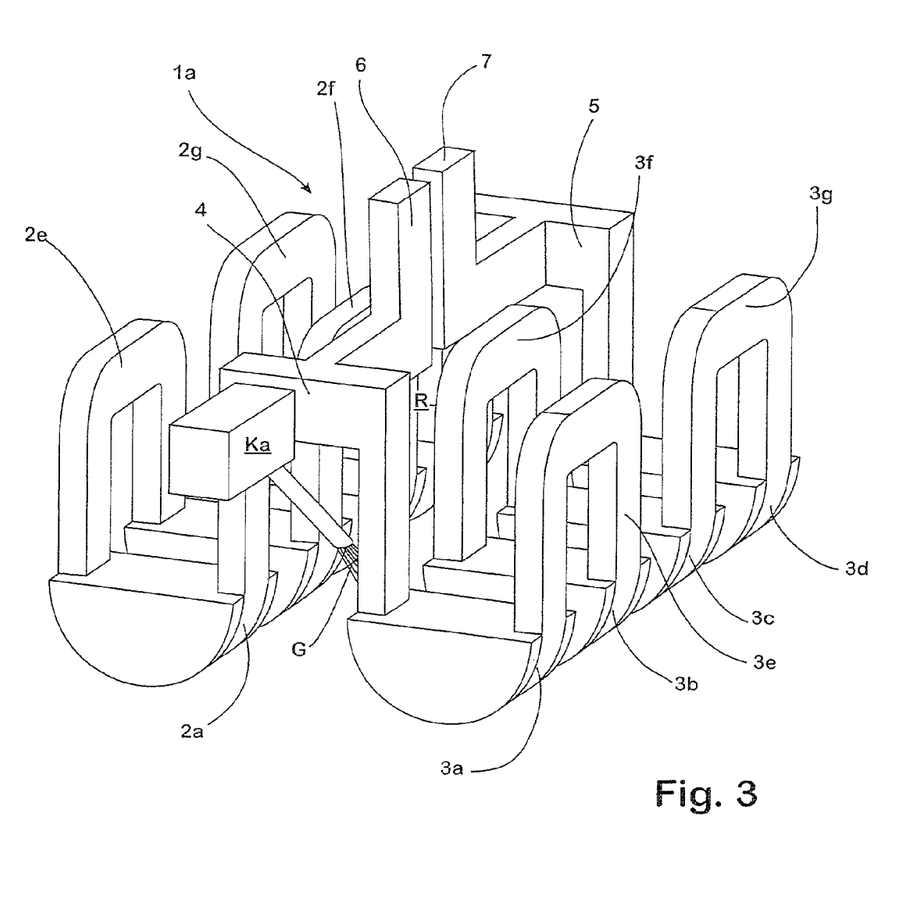
FIG. 3 is a perspective view of an alternative embodiment of inductor connected up as shown in FIG. 1.

In the case of the inductors 1, 1a, each of the segments 2, 3 of the inductors has four heating sections 2a, 2b, 2c, 2d and 3a, 3b, 3c, 3d which are connected in series and which are each aligned at right angles to the tracks L1, L2 associated with them.

The heating section 2a is connected in this case to the heating section 2b by a connecting section 2e which is aligned parallel to the associated track L1 and which is associated with the outer side, remote from the track L2, of the track L1, the heating section 2b is connected to the heating section 2c by a connecting section 2f which is likewise aligned parallel to the associated track L1 but which is associated with the inner side, directly adjacent the track L2, of the track L1, and the heating section 2c is connected to the heating section 2d by a connecting section 2g which is likewise aligned parallel to the associated track L1 but which, like the connecting section 2e, is associated with the outer side of the track L1.

In the same way, the heating section 3a is connected to the heating section 3b by a connecting section 3e which is aligned parallel to the associated track L1 and which is associated with the outer side, remote from the track L3, of the track L1, the heating section 3b is connected to the heating section 3c by a connecting section 3f which is likewise aligned parallel to the associated track L1 but which is associated with the inner side, directly adjacent the track L3, of the track L1, and the heating section 3c is connected to the heating section 3d by a connecting section 3g which is likewise aligned parallel to the associated track L1 but which, like the connecting section 3e, is associated with the outer side of the track L1.

The heating sections 2a-2d and 3a-3d are each matched to the cross-sectional shape of the tracks L1, L2 and thus sit, in the operating position, in the associated tracks L1, L2 in positive interengagement therewith at a short distance from the surface thereof. To allow the field induced by them to be more satisfactorily concentrated, the heating sections 2a-2d, 3a-3d are provided in a known way with soft-magnetic cores, which are merely indicated here, or with a set of laminations (not shown) which act in a corresponding way.

At their ends which are not connected to the respective adjacent heating sections 2b and 3b, the heating sections 2a and 3a are connected together at a bridge 4. In the same way, those ends of the heating sections 2d and 3d which are not connected to the respective adjacent heating sections 2c and 3c are connected together by a bridge 5. The bridges 4, 5 are aligned at right angles to the tracks L1, L2 in this case and span the material portion S.

In addition, there are connected to the bridge 4 a first supply arm 6 of the inductor 1, 1a and to the bridge 5 a second supply arm 7 thereof. The supply arms 6, 7, which are connected to a power supply (not shown), are arranged in the space R bounded laterally by the longitudinal sides of the segments 2, 3 of the inductor and are aligned with their axes parallel to the tracks L1, L2 and to the connecting sections 2e-2g and 3e-3g of the segments 2, 3 of the inductor. Their length is less by a small undersize than half the length of the segments 2, 3 of the inductor as measured in the longitudinal direction L of the tracks L1, L2 and they thus come together in the centre of the inductor 1, 1a while remaining at a spacing which is adequate for electrical insulation.

Regardless of how the flow of current F is fed into the supply arms 6, 7 and the segments 2, 3 of the inductor which are supplied by them, the flow of current F in the supply arms 6, 7 is always in the opposite direction to the flow of current in the connecting sections 2f, 3f which are thus arranged in parallel and most closely adjacent to them. In this way, the field which is induced in the material portion S by the connecting sections 2f, 3f is neutralized by the field which is induced by the supply arms 6, 7. Any direct heating of the material portion 6, 7 by the fields induced by the inductor 1, 1a is thus suppressed.

Figure 5:
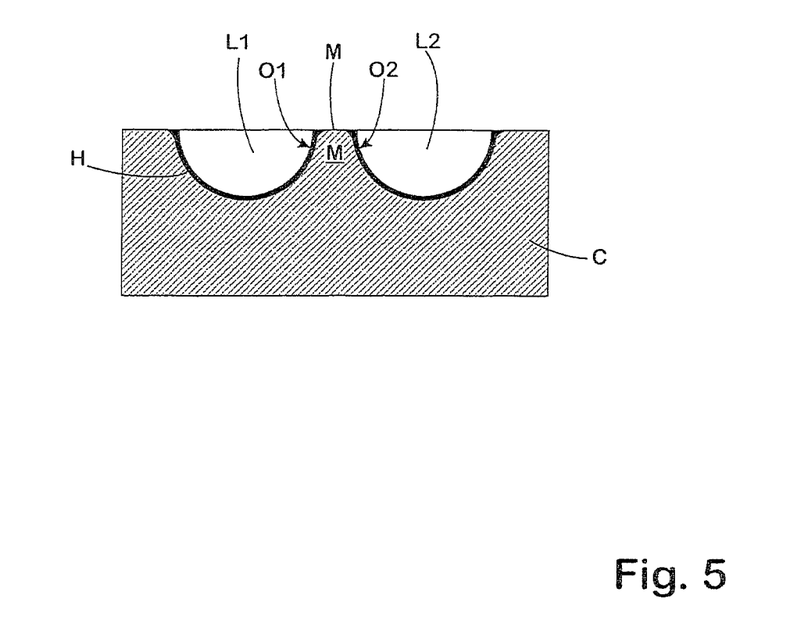
FIG. 5 is a section through a ring of a double-row rolling bearing.

Only in the regions O1, O2 of its surface which are adjacent the tracks L1, L2 is the material portion S heated to the hardening temperature by the electromagnetic fields induced by the heating sections 2a-2d and 3a-3d respectively, which means that a hardened microstructure H comes into being in these regions too in the course of the subsequent quenching.

To prevent the material portion S from being heated to the hardening temperature across its entire width Bs as a result of heat conduction, respective cooling means K and Ka are provided in the inductors 1 and 1a.

In the inductor 1 shown in FIG. 2, the cooling means K is arranged in the space R between the segments 2, 3 of the inductor. The cooling means K of the inductor 1 has in this case a cuboid housing which extends for the length l of the inductor 1 and comprises nozzles (not shown) which are arranged at regular intervals on the underside associated with the portion S and which are not visible in this case. During the heating treatment, a flow G of cooling fluid, which is for example air or some other gaseous medium such as nitrogen, is blown onto the material portion S through the nozzles.

In the inductor 1a shown in FIG. 3, the associated cooling means Ka is arranged ahead of the segments 2, 3 of the inductor in the direction of advance V. The cooling means Ka has in this case a nozzle, not visible in this case, which is formed at the tip of a tube or pipe which points into the space R between the segments 2, 3 of the inductor and from which a flow G of cooling fluid formed by air or some other suitable gaseous and impinges on the material portion S to be cooled.

The respective flows G of cooling fluid which are produced in this way carry away the excess heat and the hardening temperature is thus not reached in the central region of the material portion S, which region is not directly covered by the fields generated by the segments 2, 3 of the inductor. In this way, the central region M of the material portion S, which central region M is left between the lateral regions O1, O2 of the surface after the quenching, remains sufficiently tough for it to be able safely to absorb the loads which occur in operation.

Figure 4:
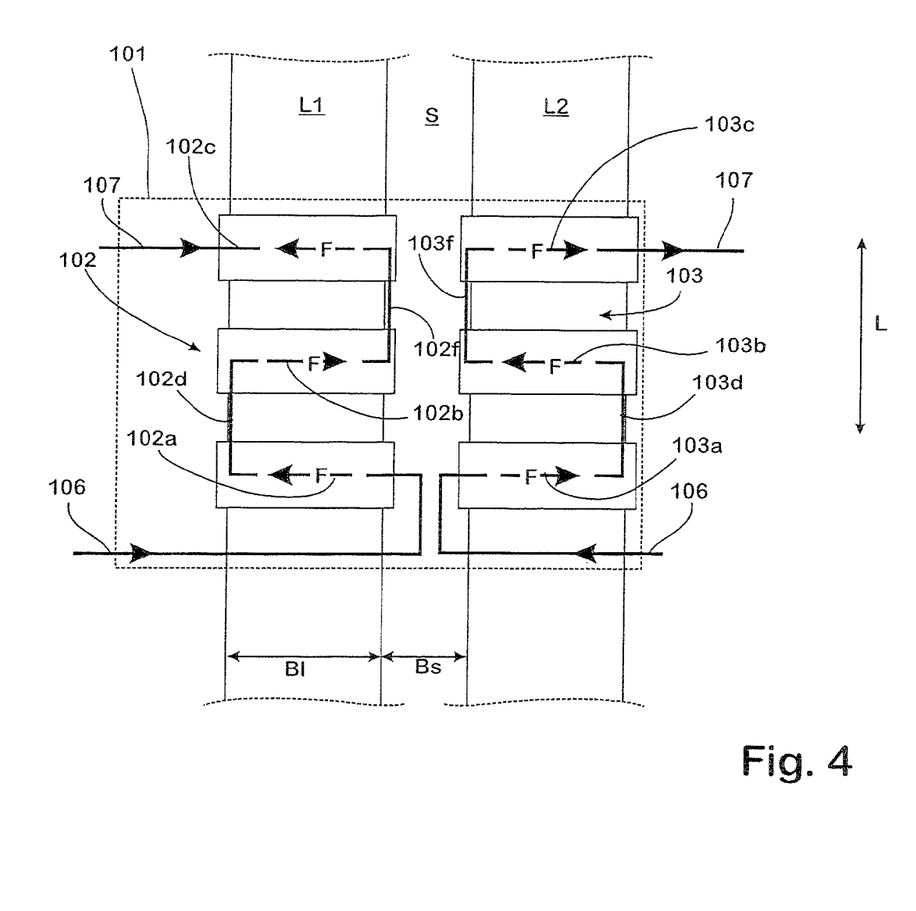
FIG. 4 shows a way of connecting up the segments and supply arms of a different inductor for hardening the tracks of a double-row rolling bearing.

The segments 102, 103 of the inductor 101 which is shown in FIG. 4 have three heating sections, 102a-102c and 103a-103c respectively, which are aligned in parallel with one another and which are connected in series and of which the mutually adjacent heating sections 102a-102c and 103a-103c respectively are, as in the case of the inductor 1, 1a, connected together by connecting sections 102d, 102e and 103d, 103e respectively. The connecting sections 102d, 103d are associated in this case with the outer sides remote from one another of the respective associated tracks L1, L2, whereas the connecting sections 102e, 103e are arranged opposite one another and closely adjacent to the material portion S.

The heating section 102a is connected at one of its ends to a first supply arm 106 of the inductor 101 while its other end is connected by a connecting section 102d to one end of the central heating section 102b. The central heating section 102b is coupled by its other end, via the connecting section 102e, to one end of the third heating section 102c of the segment 102 of the inductor. Connected to the other end of this heating section is a second supply arm 107.

The segment 103 of the inductor is constructed to be a mirror image of the segment 102 of the inductor. Hence, its heating section 103a is connected at one of its ends to the first supply arm 106 of the inductor 101, while its other end is connected via a connecting section 103d to one end of the central heating section 103b. The central heating section 103b is coupled by its other end, via the connecting section 103e, to one end of the third heating section 103c of the segment 103 of the inductor. Connected to the other end of this heating section is, once again, the second supply arm 107.

Because of this manner of connecting them up, the flow of current F through the segments 102, 103 of the inductor is in opposite respective directions, and even the fields which are induced by the connecting sections 102e, 103e in the region of the closely adjacent to one another and to the material portion S thus neutralize each other. Any direct heating of the material portion S across its entire width Bs is effectively suppressed in this way.

The inductor 101 too may of course be provided with a cooling means for cooling a strip of material which is arranged in each case between the tracks or ways which are to be hardened, although this cooling means is not shown in the present case.

REFERENCE NUMERALS

1 Inductor
2, 3 Segments of the inductor 1
2a-2d Heating sections of segment 2 of the inductor
2e-2g Connecting sections of segment 2 of the inductor
3a-3d Heating sections of segment 3 of the inductor
3e-3g Connecting sections of segment 3 of the inductor
4, 5 Bridges of the inductor 1
6, 7 Supply arms of the inductor 1
101 Inductor
102, 103 Segments of the inductor 101
102a-102c Heating sections of segment 102 of the inductor
102d, 102e Connecting sections of segment 102 of the inductor
103a-103c Heating sections of segment 103 of the inductor
103d, 103e Connecting sections of segment 103 of the inductor
106, 107 Supply arms of the inductor 101
Bl Width of the tracks L1, L2
Bs Width of the material portion S
C Ring of a rolling bearing
F Flow of current
G Flow of gas
H Hardened microstructure
K, Ka Cooling means
L Longitudinal direction of the tracks L1, L2
l Length of the inductor 1, 1a
L1, L2 Tracks
M Central region of the material portion S
O1, O2 Regions of the surface of the material portion S which adjoin the tracks L1, L2
R Space between the segments 102, 103 of the inductor
S Material portion in ridge form between the tracks L1, L2

The invention claimed is:

1. An inductor comprising:
   first and second supply arms that connect to a power supply;
   a first segment of the inductor connected to the first and second supply arms, the first segment including one or more heating sections arranged along a length direction of the inductor;
   a second segment of the inductor connected to the first and second supply arms, the second segment including one or more heating sections arranged along a length direction of the inductor, wherein the second segment is formed next to the first segment; and
   a neutralizing region that separates the first segment from the second segment, wherein current travelling through the first and second supply arms induces an electromagnetic field in the neutralizing region that neutralizes an electromagnetic field induced by current travelling though the first and second segments.

2. The inductor according to claim 1, wherein the segments of the inductor are connected to the supply arms in such a way that a direction of flow of current is in opposite directions in sections of the segments of the inductor which extend parallel to one another and which are aligned in the length direction of the inductor.

3. The inductor according to claim 1, wherein the segments of the inductor are connected in parallel with one another.

4. The inductor according to claim 1, wherein the supply arms extend between the segments of the inductor.

5. The inductor according to claim 1, wherein the segments of the inductor each have at least two heating sections which are connected in series, which extend at right angles to the length direction of the inductor, and have at least one connecting section which connects the heating sections together.

6. The inductor according to claim 5, wherein the segments of the inductor each comprise at least four heating sections connected in series.

7. The inductor according to claim 5, wherein at least one connecting section is arranged closely adjacent to the supply arms.

8. The inductor according to claim 1, wherein a cooling means is provided which delivers a cooling fluid into the neutralizing region.

9. The inductor according to claim 8, wherein the cooling means delivers a gaseous cooling fluid.

10. A method of using an inductor formed in accordance with claim 1 for the simultaneous inductive heating of two tracks or ways which are formed on a workpiece next to one another and at a distance from one another.

11. The method according to claim 10, wherein the workpiece is a part of a rolling bearing in which there have been formed two grooves for rolling elements of the rolling bearing, which grooves form the tracks or ways to be heated and are separated from one another by a material portion in the form of a ridge.

12. A method of manufacturing an article having two tracks or ways which are formed next to one another and at a distance from one another, comprising simultaneous inductive heating of the two tracks or ways using the inductor formed in accordance with claim 1.

13. The inductor of claim 1, wherein each segment includes a first heating section and a second heating section.

14. The inductor of claim 13, wherein, in each segment, the first and second heating sections are connected in series.

15. The inductor of claim 14, wherein, in each segment, the first and second heating sections are aligned at right angles to the longitudinal direction of the inductor.

16. The inductor of claim 15, wherein, in each segment, the first heating section is connected to the second heating section by a first connecting section that is aligned parallel to the longitudinal direction of the inductor.

17. The inductor of claim 16, wherein, each segment includes a third heating section connected in series with the first and second heating sections and aligned at a right angle to the longitudinal direction of the inductor.

18. The inductor of claim 17, wherein, in each segment, the second heating section is connected to the third heating section by a second connecting section that is aligned parallel to the longitudinal direction of the inductor.

19. The inductor of claim 18, wherein, in each segment, the first connecting section is remote from the neutralizing region and the second connecting section is adjacent to the neutralizing region.

20. The inductor of claim 19, wherein each segment includes a fourth heating section connected in series with the first, second and third heating sections and aligned at a right angle to the longitudinal direction of the inductor.

21. The inductor of claim 20, wherein, in each segment, the third heating section is connected to the fourth heating section by a third connecting section that is aligned parallel to the longitudinal direction of the inductor and is remote from the neutralizing region.

22. The inductor of claim 21, wherein the first heating section of the first segment and the first heating section of the second segment are connected together at a first bridge.

23. The inductor of claim 22, wherein the fourth heating section of the first segment and the fourth heating section of the second segment are connected together at a second bridge.

24. The inductor of claim 23, wherein the first bridge is connected to the first supply arm and the second bridge is connected to the second supply arm.

25. The method of claim 12, wherein a first track or way of the article is inductively heated by the first segment to a hardening temperature and a second track or way of the article is inductively heated by the second segment to a hardening temperature, and wherein the hardening temperature is not reached for a material portion of the article between the two tracks or ways that corresponds to the neutralizing region.

26. The inductor according to claim 5, wherein portions of the first and second supply arms are positioned in the neutralizing region, and wherein current travelling through the portions of the first and second supply arms induce an electromagnetic field in the neutralizing region that neutralizes an electromagnetic field induced by current travelling though the at least one connecting section of the first and second segments.

* * * * *